United States Patent [19]

Gilbertson

[11] 4,089,984

[45] May 16, 1978

[54] SWEET COATINGS FOR FOOD PRODUCTS

[75] Inventor: Dennis Gilbertson, Golden Valley, Minn.

[73] Assignee: General Mills, Inc., Minneapolis, Minn.

[21] Appl. No.: 689,438

[22] Filed: May 24, 1976

[51] Int. Cl.² .............................................. A23L 1/164
[52] U.S. Cl. .................................... 426/293; 426/93; 426/103; 426/303; 426/305
[58] Field of Search .................... 426/93, 94, 96, 103, 426/293, 291, 292, 297, 303, 307, 305

[56] References Cited

U.S. PATENT DOCUMENTS

| 202,944 | 4/1878 | Holmer | 426/94 |
|---|---|---|---|
| 1,167,127 | 1/1916 | Speare | 426/93 |
| 1,286,766 | 12/1918 | Post | 426/93 |
| 3,561,981 | 2/1971 | Roe et al. | 426/291 |
| 3,947,600 | 3/1976 | Rousseau | 426/96 |

*Primary Examiner*—Jeanette M. Hunter
*Attorney, Agent, or Firm*—Gene O. Enockson

[57] ABSTRACT

A ready to eat breakfast cereal is prepared by coating food pieces with a liquid sweetener such as honey and/or corn syrup. A powdered edible material such as finely divided protein and/or finely divided wheat germ is then applied to provide separation of the food pieces.

9 Claims, No Drawings

SWEET COATINGS FOR FOOD PRODUCTS

BACKGROUND OF THE INVENTION

The present invention relates to food products and more particularly to pre-sweetened breakfast cereals.

Pre-sweetened breakfast cereals have been regularly available to the consumer for several years. Such cereals have been prepared by first producing unsweetened cereal pieces, coating the cereal pieces with a sucrose slurry and drying the coated pieces in an oven or air current.

Cereal pieces are typically prepared by cooking a cereal dough, shaping the dough into pellets or flakes and puffing or toasting the shaped dough.

One approach for preparing breakfast cereal flakes is disclosed in U.S. Pat. No. 1,161,323. A grain material such as corn grits is combined with salt, cane sugar and water. The combination is heated in a steam-tight cooker thereby cooking the grain material. The cooked grains are partially dried and then passed between spaced, smooth-surfaced flaking rolls. The resulting flakes are puffed by baking or roasting.

In other instances whole kernels of grain have been puffed to provide a breakfast cereal. U.S. Pat. No. 1,266,448 shows such a process in which rice kernels are soaked in water for approximately 36 hours. The kernels are then subjected to heat until the kernel surface is dried. The dried kernels are popped in a popper much like popcorn.

A further process for preparing ready-to-eat breakfast cereals is described in U.S. Pat. No. 3,453,115. Cereal dough is prepared from any of various cereals such as corn, wheat, barley, or oats. The dough is pressure cooked and pelletized. The pellets are partially dried to provide case hardening and then flaked between rolls.

The various ready-to-eat breakfast cereals have been sweetened by coating the finished cereal pieces with either noncrystalline sugar or crystalline sugar. In each instance, the sugar has been sucrose. One advantageous process for preparing a ready-to-eat pre-sweetened cereal is set forth in U.S. Pat. No. 3,615,676. The previous unsweetened cereals have had the disadvantage that table sugar, which is added to the cereal and milk mixture at the time of eating, in fact is added in excess and remains in the bottom of the cereal bowl after the cereal has been consumed. The pre-sweetened cereals overcome such disadvantage and provide an appropriate amount of sugar which is not wasted. The pre-sweetened coated cereals, however, have been limited to cereals having a sucrose sweetening agent.

It is desirable to have a cereal presweetened with sweetening agents such as fructose which are normally in a liquid state. Illustrative sweetening agents of this type are honey and/or corn syrup. Such coatings have not been previously suitable since the liquid sweeteners result in a sticky, messy product. Also, such coated cereals are at best extremely difficult to dehydrate to a solid non-adhesive state.

THE PRESENT INVENTION

The present invention relates to a ready-to-eat pre-sweetened cereal which is coated with a liquid sweetener and with a powdered material to eliminate the stickiness. The present invention utilizes a liquid sweetening agent which is difficult if not impossible to dry into a usable powdered coating. In the present process the liquid sweetener may be treated to evaporate a majority of the moisture from the liquid sweetener and then applied to the cereal pieces, for example, using an enrober drum while the liquid sweetener is still at an elevated temperature and thus fluid. A dry powder or granular material, typically dextrose and/or dried milk solids is applied to the coated cereal pieces as cooling takes place. The liquid sweetener captures the dry material and the dry material substantially eliminates the cohesiveness and stickiness of the coated pieces.

The cereal of the present invention may be prepared by enrobing ten parts cereal with from one to seven parts liquid sweetener. The terms "parts" "percent" and the like will refer to parts or percent by weight unless otherwise indicated. The enrobed cereal is then dusted with from one-half to three and one-half parts dry powdered edible material. The preferred level of liquid sweetener is between about three and one half to four and one half parts. The preferred level of powdered material is between about one and one half and two and one half parts. The liquid sweetener may be any sweet flavored monosaccharide such as dextrose, fructose, maltose and the like. The liquid sweetener may include synthetic sweeteners such as saccharine or xylitol. The liquid sweetener, of course, may contain water. The liquid sweetener may contain from eighty to ninety-five percent solids and from five to twenty percent water.

The liquid sweetener may be at an elevated temperature at the time of application to the cereal. The elevated temperature makes the liquid sweetener more flowable and thus easier to apply to the cereal. The liquid sweetener may be at a temperature of between 212° and 300° F., preferably between 240° and 280° F.

The dry powdered material may be sucrose, lactose, dried corn syrup solids, corn starch, wheat starch and/or dextrose. The powdered material may be dextrose; however, various other materials may be used. The powdered material desirably is a sweet flavored material. The powdered material may include other flavoring such as fruit flavoring. The powdered material preferably may be a high nutrition material such as dehydrated powdered protein or wheat germ.

EXAMPLE I

Presweetened cereal of the present invention was prepared using 500 grams Cheerios ®. The Cheerios ® were identical to product obtainable in most grocery stores. Three hundred grams honey were heated to boiling and then enrobed onto the Cheerios ®. While the enrobed Cheerios ® were still hot, 100 grams of dry dextrose were dusted onto the Cheerios ®. The cereal was then dried at about 240° F. to a moisture content of less than four percent. An excellent presweetened cereal was obtained.

EXAMPLE II

A presweetened cereal was prepared by forming a mixture including 60 percent high fructose corn syrup and forty percent honey. The mixture was heated to boil off water until the moisture content was about 13 percent. The hot liquid sweetener, in an amount of 125 grams, was enrobed onto 500 grams of Cheerios ®. Then 50 grams of dextrose were dusted onto the enrobed Cheerios ®. The Cheerios ® were then dried to less than 4 percent. An excellent, non-sticky presweetened cereal was obtained.

EXAMPLE III

A presweetened cereal was prepared by enrobing 400 grams of Cheerios ® with 165 grams of high fructose corn syrup. The corn syrup had been heated to boiling prior to enrobing the cereal. While still hot the enrobed cereal pieces were dusted with 62 grams of powdered dextrose. The cereal was then dried to a moisture content of less than four percent. An excellent, non-sticky presweetened cereal was obtained.

EXAMPLE IV

A cereal was prepared according to the present invention by combining 200 grams powdered dextrose, 100 grams corn syrup and 25 grams water. The combination was heated to boiling. Five hundred grams of Cheerios ® were enrobed with 190 grams of the heated sweetener. The enrobed cereal was dusted with 77 grams of powdered dextrose. The resulting cereal was heated in an oven at 240° F. until the moisture content of just under four percent was obtained. The cereal was then cooled to room temperature. Although he sweet coating was present in an adequate amount for sweetening purposes, the coating was not visually apparent. An excellent cereal was obtained.

EXAMPLE V

A cereal was prepared according to the present invention by enrobing 600 grams of Cheerios ® with 685 grams of high fructose corn syrup. The corn syrup was at boiling temperature at the time of enrobing. While still hot the enrobed cereal pieces were dusted with 100 grams of sodium caseinate. The cereal was then dried to a moisture content of less than 4 percent. An excellent non-sticky presweetened, high protein cereal was provided.

EXAMPLE VI

Example V was repeated; however, the sodium caseinate was replaced with powdered soy isolate. Similar results were obtained.

EXAMPLE VII

A cereal was prepared according to the present invention by enrobing 600 grams of Cheerios ® with 685 grams of hot corn syrup. Then 425 grams of sodium caseinate were dusted onto the hot enrobed cereal pieces. The product was dried to a shelf stable moisture content. An excellent product was obtained.

EXAMPLE VIII

A cereal was prepared according to the present invention by enrobing 600 grams of puffed cereal pieces with 436 grams of corn syrup. The enrobed pieces were dusted with 54 grams of soy isolate. An excellent product resulted.

EXAMPLE IX

The present cereal was prepared by enrobing 400 grams of puffed cereal pieces with 170 grams of honey at boiling temperature. The hot enrobed pieces were dusted with a mixture of 65 grams wheat germ and 60 grams dextrose. An excellent product resulted.

The embodiments of the invention in which an exclusive property or privilege is claimed are defined as follows:

1. A process for preparing a pre-sweetened cereal comprising applying a coating of a hot, normally liquid sweetener selected from the Group consisting of fructose, maltose, dextrose and mixtures thereof to pieces of ready-to-eat cereal thereby yielding a product which is sticky and difficult to dehydrate to a solid non-adhesive state and then applying a powdered edible material to said coated pieces in an amount sufficient to make the said coated pieces non-sticky, said hot, normally liquid sweetener being at a temperature of 212° to 300° F. and containing 5 to 20 percent by weight water and 80 to 95 percent by weight solids.

2. The process of claim 1 wherein said ready-to-eat cereal pieces are present in an amount of 10 parts by weight, said liquid sweetener is present in an amount of from about one to seven parts by weight and said powdered edible material is present in an amount of from about one-half to three and one-half parts by weight.

3. The process of claim 2 wherein the powdered edible material is applied to the said coated pieces while said pieces are still hot.

4. The process of claim 3 wherein the said non-sticky pieces are dehydrated to a moisture content of less than four percent by weight.

5. The process of claim 3 wherein the said liquid sweetener is corn syrup.

6. The process of claim 5 wherein the corn syrup is high fructose corn syrup.

7. The process of claim 3 wherein the said liquid sweetener is partially dehydrated honey.

8. The process of claim 3 wherein the powdered edible material is finely divided protein.

9. The process of claim 3 wherein the powdered edible material is finely divided wheat germ.

* * * * *